United States Patent Office 3,345,972
Patented Oct. 10, 1967

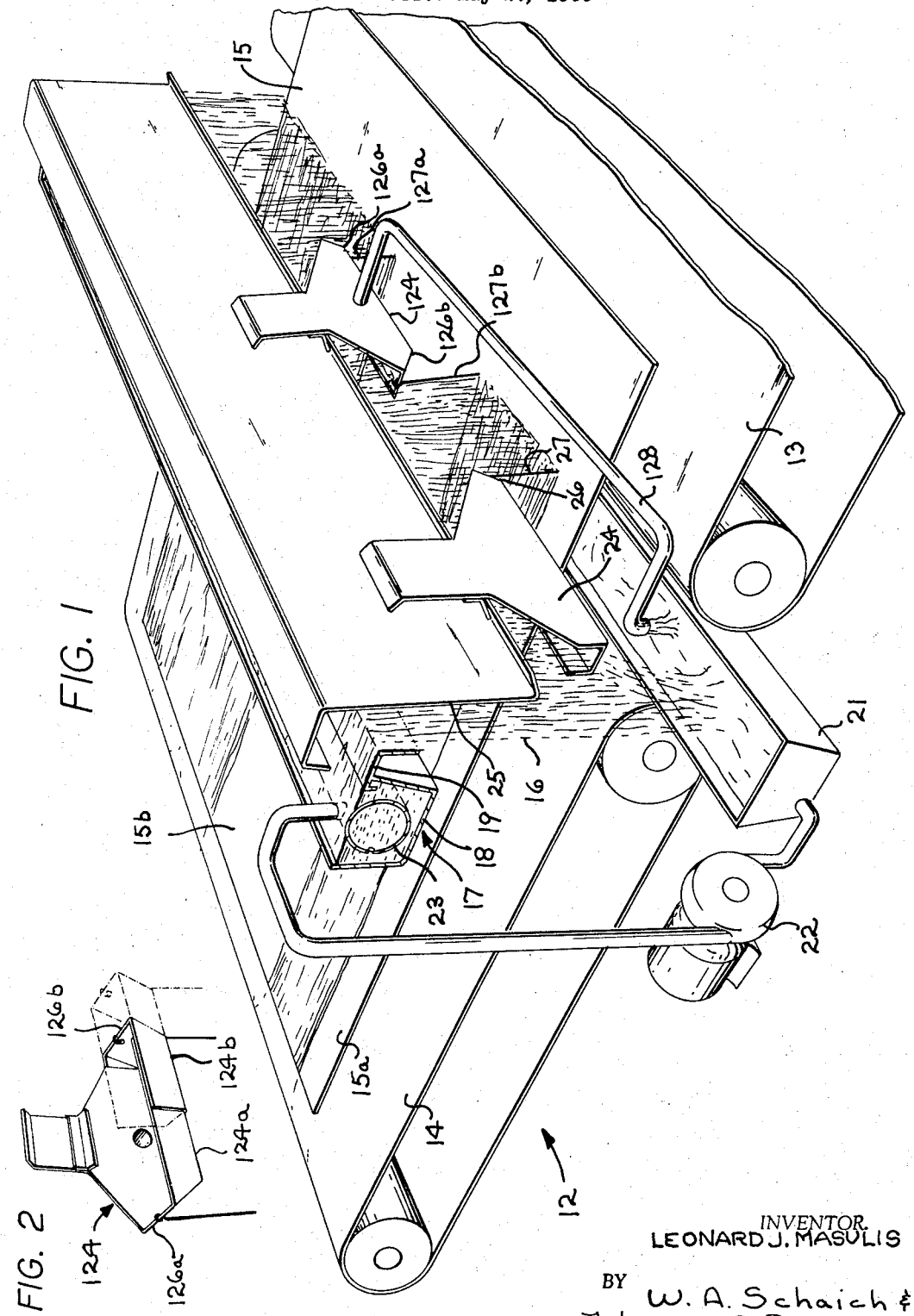

3,345,972
MEANS TO ADJUST EFFECTIVE WIDTH
OF CURTAIN COATER
Leonard J. Masulis, Riverdale, Ill., assignor to Owens-Illinois, Inc., a corporation of Ohio
Filed May 20, 1965, Ser. No. 457,265
9 Claims. (Cl. 118—301)

This invention relates to apparatus for applying a liquid coating to an object. More particularly, the invention relates to apparatus for applying a liquid coating to a portion of the planar upper surface of an object. Specifically, the invention relates to apparatus for applying a liquid coating to selected portion of the upper surface of a substantially horizontal sheet of fibreboard by means of curtain coating equipment of otherwise conventional construction wherein the sheet is moved in substantially horizontal direction through a free-falling vertical curtain of coating material.

In the coating of planar fibreboard objects such as sheets, carton blanks and the like, with coatings such as wax-plastic blends ("hot-melt" coatings) for moisture resistance, it is frequently desirable to leave areas of the object, such as an edge area free from coating to allow for the subsequent application of adhesives, printing, decorating material, and the like. Such selective coating has, heretofore, not been satisfactorily attainable by any of the popular curtain coating techniques which otherwise are quite economical and otherwise well-suited for the application of such coatings to fibreboard objects.

Accordingly, it is an object of the present invention to provide apparatus for curtain-coating a selected area of an object. It is a further object of the invention to provide apparatus for coating a selected area of a planar object such as an area of the upper surface of a substantially horizontally oriented sheet of fibreboard.

For a further understanding of the present invention, attention is directed to the following portion of the specification, the drawing, and the appended claims.

In the drawings:

FIG. 1 is a perspective view of apparatus in accordance with the present invention and useful in practicing a method in accordance with the present invention omitting, however, such supporting structure, drive equipment, and the like, not necessary for an understanding of the invention; and FIG. 2 is a perspective view of a modification of an element of the apparatus of FIG. 1.

In accordance with the present invention, there is provided conveying means comprising a pair of endless belt conveyors 11 and 12 having horizontally aligned and horizontally oriented upper conveying reaches 13 and 14, respectively. Conveyors 11 and 12 are longitudinally aligned and are spaced apart to define a coating region therebetween. The spacing between conveyors 11 and 12 is sufficiently small that planar objects 15 horizontally situated on conveyor flight 13, such as carton blanks, will be able to extend across to conveyor flight 14 for transfer thereto.

A thin free-falling curtain of liquid coating material 16 is formed laterally of conveyors 11 and 12 in the region therebetween by means comprising a curtain forming head 17 which comprises a pan 18 filled with liquid 16 and a carefully constructed overflow weir 19 for passage of liquid 16 therefrom. Any of coating material 16 falling beyond the extent of sheets 15 is caught in trough 21 extending laterally of conveyors 11 and 12 at an elevation lower than the elevation of conveyor reaches 13 and 14.

Coating material caught in trough 21 may be returned to curtain forming head 17 by motor-driven pump 22 and is distributed within pan 18 by means of ported tube 23. The present invention has been found to have particular utility in the coating of corrugated fibreboard box blanks with a "hot-melt" coating (a blend of plastic and wax) and in such cases there is provided heating means (not shown) to heat coating material to a temperature within a relatively narrow predetermined range. Curtain coating machines as thus far described are available from the Gasway Corporation, Chicago, Ill. It is also contemplated that the invention hereinafter described can be used to advantage in conjunction with other types of curtain coating machines such as Steinemann curtain coaters.

In the curtain coating of box blanks with a hot melt coating, it is frequently desirable to leave an edge area of the blank, e.g. area 15a of sheet 15, uncoated in order to allow for the subsequent application of an adhesive to the blank to permit the erection of a carton with a glued joint from the blank; conceivably, it may alternately or additionally be desired to leave an area of sheet 15 intermediate the edges thereof, e.g. area 15b of sheet 15, uncoated to permit subsequent application of labels, printing, and the like. In accordance with the present invention, an edge and/or intermediate area of sheet 15 extending parallel to the direction of movement or path of travel of sheet 15 through the curtain of material 16 may be left uncoated by providing means to catch or intercept the portion of the free-falling curtain that would otherwise fall on the area to be left uncoated and to divert the intercepted portion away from sheet 15, for example, by diverting it to trough 21. Thus, an edge area of sheet 15 is left uncoated by providing a receiver member 24 having an upwardly facing concave surface disposed above the path of travel of sheet 15, such as a channel-shaped member, in vertical alignment with curtain forming head 17 for catching the portion of the curtain of material that would otherwise fall on area 15a of sheet 15.

Channel-shaped member 24 is frictionally attached to a head cover member 25 that is conventionally provided over curtain head 17, or otherwise retained in place as desired, and is provided with a closed end disposed above the path of travel of sheet 15 and an open end disposed above trough 21 exteriorly of the edge of sheet 15. The bottom of member 24 is inclined downwardly at a small angle to the horizon from the closed end to the open end to facilitate the return of coating material to trough 21. The closed end of member 24 comprises a plate 26 extending downwardly from its upper limit at an angle inclined toward the other end and across the curtain of material 16. Plate 26 is preferably constructed of thin material or is sharpened at its upper limit to present a "knife-edge" to the falling curtain to thereby limit the extent of the unintercepted portion of the curtain with dimensional accuracy.

To prevent the edges of the curtain from contracting as the curtain travels the vertical path from member 24 to sheet 15 due to the surface tension of coating material 16, it is desirable to locate member 24 at as low an elevation above the path of travel of sheet 15 as is convenient; preferably, the upper edge of plate 26 is closer to the upper surface of sheet 15 than to the top of overflow weir 19. Additionally, it has been found useful to provide a narrow elongate member 27 extending downwardly from receiver 24 at a point on the upper edge of plate 26 where the curtain is intercepted to a point immediately above the surface of sheet 15. Member 27 may be comprised of a beaded chain which is believed to be of advantage because of its relatively high surface area to be wetted; alternatively, member 27 may be comprised of a thin wire for precise definition of the lateral extent of the coated area of sheet 15.

Area 15b of sheet 15 may be left uncoated by providing a receiving member 124 likewise frictionally attached to head cover member 25 and comprising two closed ends 126a and 126b each of which is disposed above the path of travel of sheet 15. End plates 126a and 126b extend downwardly from their respective upper limits toward one another and each extends across the curtain of material and presents a sharp edge thereto. Receiving member 124 may also be provided with narrow elongate members 127a and 127b extending downwardly from points on the upper edges of plates 126a and 126b, respectively, where the curtain is intercepted toward the upper surface of sheet 15. Coating material intercepted by member 124 may be returned to trough 21 by providing conduit means 128 extending from a low elevation of member 124 generally downwardly to trough 21.

Variation of the width of uncoated area 15b may be accomplished by constructing member 124 of a pair of telescopable half-members 124a and 124b as is shown in FIG. 2.

It is believed that the best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and, it is, therefore, desired to limit the invention only in accordance with the appended claims.

I claim:

1. Apparatus for applying a coating of a liquid material to a portion of the upper surface of a planar object comprising: conveyor means for conveying the planar object in a substantially horizontally oriented position along a substantially horizontally extending path of travel; curtain-forming means for establishing a thin vertically falling curtain of said liquid material extending across said path beyond the lateral extremities of the planar object; trough means disposed beneath the path of travel for catching falling liquid material that falls beyond the lateral extremities of the planar object; means for preventing a portion of the upper surface of the planar object extending parallel to its path of travel from being coated with liquid, said means comprising a channel-shaped member disposed at an elevation above the upper surface of the planar object and at a location in vertical alignment with said curtain-forming means and having a closed end disposed above the path of travel of the planar object, said channel-shaped member serving to intercept a portion of the falling curtain; said closed end comprising a member extending downwardly from its upper limit at an angle inclined toward the other end and wherein the other end of the channel-shaped member is spaced horizontally exteriorly of the path of travel of the planar object and is disposed vertically above the trough means, whereby the intercepted portion of the curtain is diverted to the trough means as a free falling stream; and curtain guide means comprising a narrow elongate member extending downwardly from the closed end of the channel-shaped member to a position closely adjacent the upper surface of the planar object.

2. Apparatus according to claim 1 wherein the bottom of the channel-shaped member is inclined downwardly from the closed end to the open end at a small angle to the horizon.

3. Apparatus according to claim 1 wherein the narrow elongate member is a beaded chain.

4. Apparatus according to claim 1 wherein the narrow elongate member is a thin wire.

5. Apparatus according to claim 1 wherein the bottom of the channel-shaped member is disposed closer to the upper surface of the planar object than to the curtain forming means.

6. Apparatus for preferentially applying a liquid coating material to the upper surface of a substantially horizontally oriented sheet of fibreboard excepting an edge portion of said sheet extending parallel to the direction of movement of said sheet, said apparatus comprising: conveying means for moving the sheet in a substantially horizontal direction; curtain forming near extending across the sheet and laterally of its direction of movement for establishing a free-falling curtain of coating material; trough means disposed under the sheet and in vertical alignment with the curtain forming means for catching coating material falling beyond the extremities of the sheet; a receiver having an upwardly facing concave surface disposed above the sheet and in vertical alignment with the curtain forming means for intercepting a portion of the falling curtain that would otherwise fall on the edge portion of the sheet; said receiver being provided with an outlet disposed horizontally beyond the edge of the sheet and vertically above the trough for returning intercepted coating material to the trough and said receiver having a wire-like member extending downwardly toward the sheet from the location of the receiver that is effective to define the lateral extent of the unintercepted portion of the falling curtain.

7. Apparatus according to claim 6 wherein said wire-like member is a beaded chain.

8. Apparatus for preferentially applying a liquid coating material to the upper surface of a substantially horizontally oriented substantially horizontally moving sheet of fibreboard excepting a portion thereof disposed intermediate the edges of the sheet and extending parallel to its direction of movement, said apparatus comprising: conveying means for moving the sheet in a substantially horizontal direction; curtain forming means extending across the sheet and laterally of its direction of movement for establishing a free-falling curtain of coating material; trough means disposed under the sheet and in vertical alignment with the curtain forming means for catching coating material falling beyond the extremities of the sheet; a receiver having an upwardly facing concave surface disposed above the sheet and in vertical alignment with the curtain forming means and trough means and being horizontally situated between the extremities of the sheet that extend parallel to its direction of movement for intercepting a portion of the falling curtain that would otherwise fall on the portion of the sheet passing thereunder; said receiver being provided with an outlet at a low elevation thereof and further comprising conduit means in communication with the outlet for returning intercepted material to the trough; and said receiver having a pair of wire-like members extending downwardly toward the sheet from the spaced-apart portions of the receiver that are effective to define the lateral extents of the unintercepted portions of the falling curtain.

9. Apparatus according to claim 8 wherein said receiver comprises first and second telescoping members for adjusting the dimension of the receiver in a horizontal direction extending laterally of the direction of movement of the sheet for adjusting the width of the uncoated portion of the sheet.

References Cited

UNITED STATES PATENTS

| Re. 25,511 | 1/1964 | Magnuson | 222—318 X |
| 1,741,169 | 12/1929 | Thompson | 239—510 X |
| 1,841,431 | 1/1932 | Chapin | 118—301 |
| 2,382,065 | 8/1945 | Kappeler | 118—301 |
| 2,440,084 | 4/1948 | Goda | 118—301 X |
| 2,976,837 | 3/1961 | Glaus | 118—324 |

(Other references on following page)

| | | | |
|---|---|---|---|
| 3,189,283 | 6/1965 | Moore | 239—505 X |
| 3,205,089 | 9/1965 | Kinzelman | 118—324 |
| 3,242,003 | 3/1966 | Brown | 118—324 |

FOREIGN PATENTS

| | | |
|---|---|---|
| 123,797 | 7/1931 | Austria. |
| 586,208 | 10/1933 | Germany. |
| 908,653 | 10/1962 | Great Britain. |

OTHER REFERENCES

"Paperboard Packaging-Data Sheet," Patrick A. Toensmeier, 2 pages, Converting B–13, October 1960.

MORRIS KAPLAN, *Primary Examiner.*